FINE-COARSE TUNING DRIVE

Filed June 17, 1966 2 Sheets-Sheet 1

INVENTORS
CHARLES W. MORITZ
ALFRED SFREDDO
BY
James and Franklin
ATTORNEY

FINE-COARSE TUNING DRIVE

Filed June 17, 1966 2 Sheets-Sheet 2

INVENTORS
CHARLES W. MORITZ
ALFRED SFREDDO
BY
James and Franklin
ATTORNEY

United States Patent Office 3,413,861
Patented Dec. 3, 1968

3,413,861
FINE-COARSE TUNING DRIVE
Charles W. Moritz, Wilbraham, Mass., and Alfred Sfreddo, Stafford Springs, Conn., assignors to General Instruments Corporation, a corporation of Delaware
Filed June 17, 1966, Ser. No. 558,318
8 Claims. (Cl. 74—10.5)

ABSTRACT OF THE DISCLOSURE

A fine-coarse drive for a tuner is provided, the input shaft directly rotating a cam through a driving connection having a non-slip drive characteristic for normal drive forces, there being a lost motion connection between that cam and a gear which in turn provides coarse drive, a spring being interposed between the gear and the cam so as to simultaneously position the gear and urge the cam into said driving connection with the input shaft.

The present invention relates to a novel construction for a two-speed drive particularly well adapted for providing both fine and coarse control for a communications set tuner.

Communications equipment is often tuned through the movement of one or more elements forming part of a variable electrical component. Movement over an appreciable distance is needed in order to vary the tuning of the communication equipment over the entire applicable band, but fairly precise positioning of the movable element is required if optimum tuning of a particular station or channel within that band is to be achieved. It is usually desirable to provide a single tuning control member which is to be manually manipulated. For coarse tuning, that is to say, rapid movement of the tuning part from one position to another, a small movement of the manually accessible member should produce a relatively large movement of the tuning element, thus permitting a quick and convenient change from one station or channel to another. Once the channel has been roughly tuned in through manipulation of the coarse drive, more accurate tuning is effected by means of a fine drive, in which a comparatively large movement of the manually accessible member is required to produce a comparatively small movement of the tuning element.

Various arrangements have been proposed in the past for connecting the single manually accessible member to the tuning element and providing for both coarse and fine drive of the tuning part from that member. In one such arrangement the input to the driving connection between manually moved member and tuning element includes a cam which, when moved over a limited range of movement, causes a slight degree of movement of the tuning element for fine-tuning. After the cam has been moved through that fine-tuning range the input to the system provides for coarse drive of the tuning element. Since the cam has come to the end of its operative movement just before the coarse drive takes over, the cam means thereafter remains stationary, a slip clutch of some sort must be provided between itself and the input from the manually accessible member. Another slip clutch must be provided between the tuning element and the fine-drive output from the cam. These slip clutches are a source of complexity and expense. They also constitute the parts of the system most susceptible to wear, since they both slip each time the coarse tuning drive is actuated.

It is the prime object of the present invention to devise a combined coarse and fine drive for a tuning unit or the like which is functionally superior to prior art devices and which is at the same time considerably less expensive to manufacture and considerably more reliable and long lived in operation than such prior art devices. More specifically, it is a prime object of the present invention to devise such a tuning arrangement which utilizes but a single slip clutch instead of the two slip clutches which characterized comparable prior art arrangements.

To this end the cam, in the structure of the present invention, is rigidly connected to an input element and is provided with an operative cam surface equal in extent to the movement thereof corresponding to movement of the tuning part over the fine tuning range plus that movement of the cam in coarse drive corresponding to movement of the tuning part from one of its operative extremes to the other. When, as is usually the case, the drive is of the rotatable type, the cam may well then be provided with an operative surface comprising more than a complete rotation. The rigid connection between the cam and the input element eliminates the need for any slip clutch at that point in the transmission system, but the elongated operative cam surface enables the system to shift from coarse to fine drive with at least the same facility as in prior art devices which utilized a slip clutch between the cam and the input member.

An important drawback in the prior art devices where two slip clutches were used was that an appreciable amount of force had to be exerted by the user in order to produce coarse tuning—both clutches had to be forced to slip, and each clutch required a certain amount of force to be applied thereto before it would slip. Through the use of but a single slip clutch, as is here disclosed, the torque levels required for coarse tuning are greatly reduced, and hence the tuners are made much more acceptable to the users thereof. Thus, the device of the present invention is functionally superior to the comparable prior art devices even though it utilizes fewer parts and is less costly.

In the form here specifically disclosed the cam itself constitutes a portion of the coarse drive, that coarse drive including a degree of lost motion corresponding to the desired movement of the cam to produce the fine drive. When the cam is moved in its fine drive area the coarse drive is not directly driven. When the cam has been moved through its fine drive area a part connected to the cam engages the coarse drive and the cam continues to move, actuating the coarse drive. The extended length of the operative cam surface on the cam permits the cam to thus move in coarse drive action, but the cam is always ready for fine drive control merely by rotating the input member in the opposite direction from that in which it had been rotated, once an approximate tuning position has been reached. The cam may readily be so designed as to provide very high degrees of fine tuning action, producing in the tuning element a movement 150th or 100th of the amount produced in coarse drive for a corresponding degree of cam movement. Such fine tuning is rendered available at all points over the desired range of movement of the tuning element.

To the accomplishment of the above, and to such other objects as may hereinafter appear, the present invention relates to the construction of a fine-coarse tuning drive as defined in the appended claims and as described in this specification, taken together with the accompanying drawings, in which:

Figure 1:
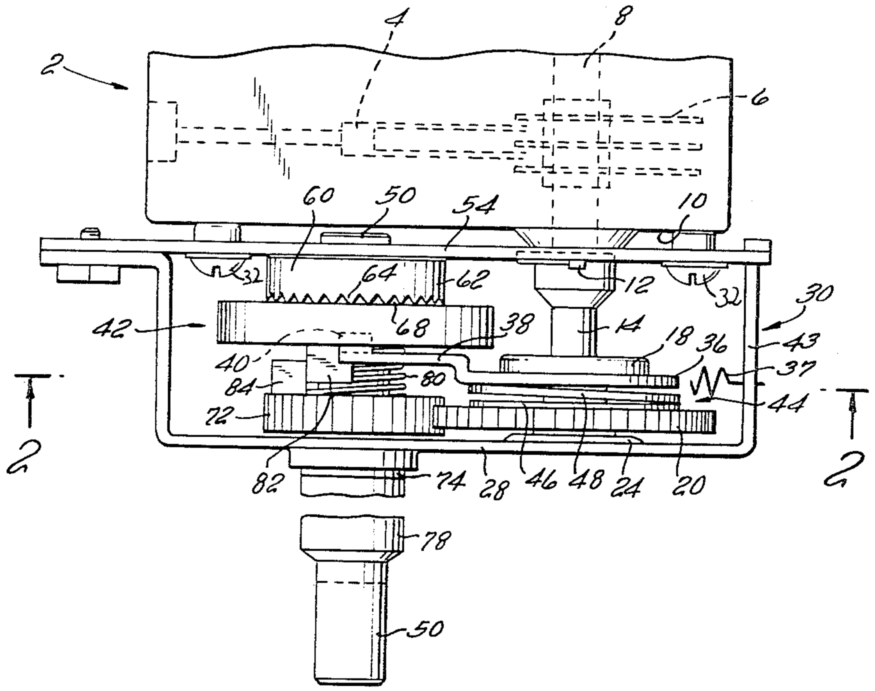
FIG. 1 is a top plan view of a preferred embodiment of the present invention, the tuning unit proper being shown only fragmentarily.

The tuning drive assembly of the present invention is suitable for many uses. It is here disclosed, by way of example, as used for tuning a television set tuner generally designated 2, the particular type of tuner selected for illustrative purposes having one or more stator elements 4 and one or more rotor elements 6, the latter being movable relative to the former in order to vary the electical parameter involved and thereby produce the desired tuning effect. As here disclosed the stator element 4 and the rotor element 6 are in the nature of plates of a rotary variable condenser (although, in the context of a television tuner, they generally constitute tuning parts for the end of a high frequency transmission line or the like). The rotor element 6 is mounted on a shaft 8 which extends out beyond the end wall 10 of the tuner 2. The shaft 8 and the rotor element 6 carried thereby may be considered as the tuning element, since it is its movement which produces the tuning effect. They may also individually or collectively be considered as the output element of the tuning drive. For providing tuning from one end of the desired communication band to the other the output element 8 must be rotated through a given degree of operative movement which, in the case of a tuner 2 of the type illustrated, is generally something less than 360°.

The shaft 8 is keyed, at 12, to a shaft extension 14 having a knurled portion 16 on which flanged part 18 and gear 20 are made fast, the flanged part 18 and the gear 20 being axially spaced from one another. The free end 22 of the shaft extension 14 is mounted in carrying ring 24 which in turn is journaled in aperture 26 in the end wall 28 of a bracket generally designated 30 which is secured by screws 32 to the tuner 2. The flanged part 18 is provided with a hub 34 on which a disk 36 is mounted, that disk having an arm 38 extending out therefrom and having a finger 40 projecting from the end thereof, the finger 40 defining a follower which cooperates with the fine-tuning cam member generally designated 42. The disk 36 is operatively connected to the flanged part 18 by means of a spring clutch generally designated 44 and comprising a washer 46 bearing against the gear 20 and a spring element 48 compressed between the washer 46 and the disk 36 and active to urge the disk 36 into frictional engagement with the flanged part 18.

Figure 2:
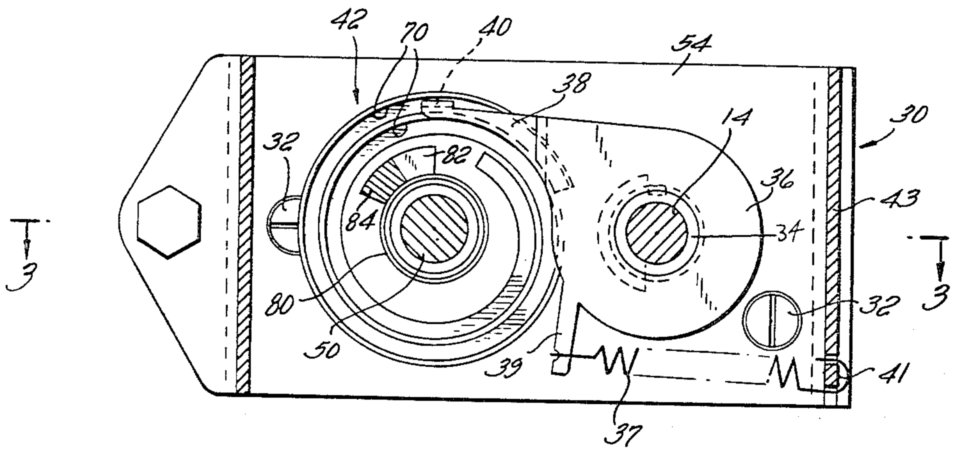
FIG. 2 is a cross sectional view taken along the line 2—2 of FIG. 1.

The input element to the tuning drive comprises a shaft 50 the inner end of which is journaled at 52 in an end wall 54 of the bracket 30 and the outer end of which, adapted to be manually rotated for tuning purposes, extends out forwardly from the bracket front wall 28, passing freely through an opening 56 formed in that front wall. Mounted on the inner end of the shaft 50, and made fast therewith by means of pin 58, is a ring 60 having an axially forwardly extending rim flange 62 provided with teeth 64. The cam member 42 is mounted on the shaft 50 so as to be rotatable relative thereto and has an axially rearwardly extending rim flange 66 provided with teeth 68 which mate and mesh with the teeth 64 on the rim 62. The outwardly extending face of the cam member 42 is provided with a spiral groove 70 defining the operative cam surface thereof, which, as may best be seen from FIGS. 2 and 4, extends for considerably more than a complete circle and, as shown, extends for somewhat more than two complete circles. The groove 70 is helical with respect to the axis of the shaft 50 and of the cam member 42, and the finger 42 on the arm 38 extending from the disk 36 is received within and rides inside the groove 70. A spring 37 is tensioned between finger 39 extending from disk 36 and point 41 on the side wall 43 of the bracket 30, the spring 37 acting to retain the finger 42 against the proper surface of the cam groove 70. Thus as the cam member 42 is rotated the finger 40 will be moved toward and away from the axis of the shaft 50, causing the disk 36 to rotate about the axis of the shaft extension 14. Thus when the cam 42 is rotated counter-clockwise from its position shown in FIG. 4 through approximately 250° the position of FIG. 2 will be realized, in which position the finger 40 has been moved upwardly by a distance equal to the pitch of the cam groove 70, causing a corresponding slight rotation of the disk 36, for example amounting to three degrees.

A second gear 72 is freely mounted on the shaft 50 inside the bracket 30 and meshes with the gear 20. It has a portion 74 which extends out through the opening 56 in the bracket front wall 28 and which is secured by pin 76 to sleeve 78 which is freely rotatably mounted on the shaft 50. A spring 80 is compressed between the gear 72 and the cam member 42, thus retaining the gear 72 in proper axial position meshing with the gear 20 and urging the cam member 42 inwardly so that its teeth 68 mesh with the teeth 64 on the ring 60. The cam member 42 is provided with an axially outwardly extending lug 82 and the gear 72 is provided with an axially inwardly extending lug 84, the two lugs being of reduced circumferential or angular extent but being located in part substantially in the same plane normal to the axis of the shaft 50, so that the lug 84 is in the path of movement of the lug 82.

Figure 3:
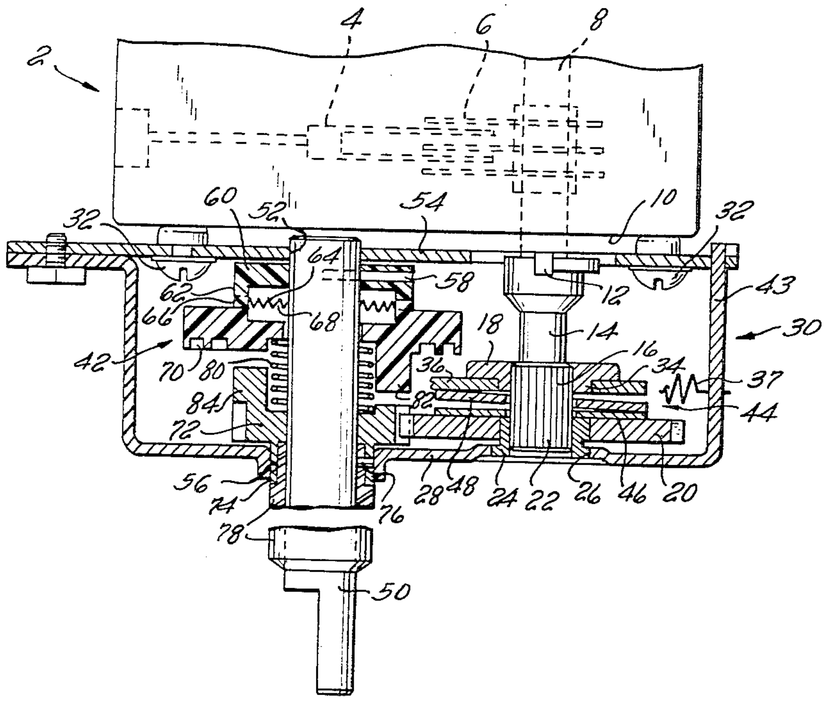
FIG. 3 is a cross sectional view taken along the line 3—3 of FIG. 2 but showing the cam and associated parts in a different operative position.
Figure 4:
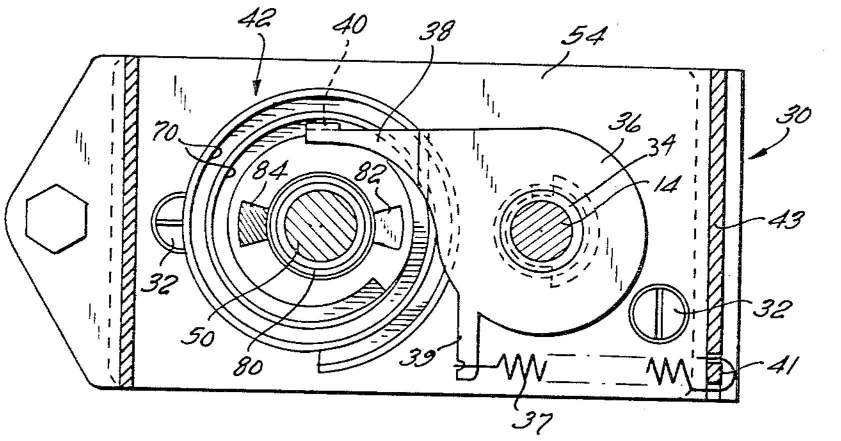
FIG. 4 is a view similar to FIG. 2 but showing the cam and associated parts in their position of FIG. 3.

The operation of the tuning drive of the present invention may perhaps best be described starting with the position of the parts in FIGS. 3 and 4, where the lug 82 on the cam member 42 is appreciably angularly spaced from the lug 84 on the gear 72. If the input shaft 50 is rotated in a counter-clockwise direction from its position shown in FIG. 4, this will cause a corresponding rotation of the ring 60 and of the cam member 42, the former driving the latter through their engaged teeth 64 and 68 respectively, which are held in engaged position by the spring 80. During the first part of such movement the cam member 42 will rotate but the gears 72 will not be driven thereby, because the lug 82 has not yet reached the lug 84. The finger 40 on the arm 38 will, however, be riding within the cam groove 70 and will therefore be moved upwardly as viewed in FIG. 4, thus causing clockwise rotation of the disk 36. Since the spring clutch 44 presses the disk 36 against the flanged element 18 and since the flanged element 18 is fast with the shafts 14 and 8, a corresponding slight clockwise movement of the shaft 8 will be produced. Because of the slight inclination of the cam groove 70, an appreciable rotation of the input shaft 50 through, say 90°, will cause a much smaller degree of rotation of the output shaft 14, 8 on the order of, say two degrees. Thus a fine tuning drive is effected.

When the shaft 14 thus rotates clockwise through this small amount, the gear 20 will be similarly rotated, the gear 72 will be correspondingly rotated in a counter-clockwise direction, and the sleeve 78 will be similarly rotated. The sleeve 78 may be used for mounting an indicator, or for any other desired purpose.

When the shaft 50 has been rotated from its position shown in FIGS. 3 and 4 sufficiently to bring the lug 82 on the cam body 42 into engagement with the lug 84 on the gear 72, the gear 72 will thereafter be driven by the cam body 42 for so long as the input shaft 50 continues to be rotated in its initial counter-clockwise direction. This will produce a corresponding clockwise rotation of gear 20 and hence of the output shaft 14, 8. The degree of such clockwise movement of the output shaft 14, 8 will be relatively large, as determined by the gear ratio between the gears 72 and 20. This will produce a coarse or rapid movement of the output shaft 14, 8, and a consequent rapid movement of the movable tuning element 6. During this movement the finger 42 remains within the helical groove 70 as the cam body 42 is driven in rotation by the shaft 50. The shaft 14, and with it the flanged element 18, is positively driven in rotation much more rapidly than the disk 36 is rotated by the cam groove 70, and as a result the disk 36 slips with respect to the flanged element 18 by virtue of the existence of the slip clutch 44.

When, during this coarse drive, a desired tuning status is approximately effected, fine tuning is produced simply by reversing the direction of rotation of the shaft 50, causing the lug 82 to move away from the lug 84 and thus permitting the cam body 42 to rotate without positive drive of the gear 72. This fine tuning action is provided over approximately 345 degrees of rotation of the shaft 50, after which the cam lug 82 will again engage the gear lug 84, although on the opposite side thereof from that which was previously engaged thereby, and continued movement of the shaft 50 in its new direction will produce coarse tuning drive in that new direction.

Thus the operative extent of the cam groove 70 to produce fine drive corresponds to something slightly less than 360 degrees of rotation of the cam body 42, but the actual operative length of the cam groove 70 corresponds to that approximately 345 degrees plus such rotational movement of the cam body 42 as may be required to drive the output shaft 14, 8 in coarse drive through its entire range of tuning movement. As a result no slip clutch need be provided between the cam body 42 and the input shaft 50, yet fine tuning of appreciable magnitude is provided at every point over the desired tuning range and no matter in which direction tuning is effected. During coarse tuning only a single clutch (the clutch 44) need be caused to slip, and hence the torque required for coarse tuning is kept to a remarkably low value.

The combination of the spring 80 and the teeth 64 and 68 constitutes a relief clutch which does not slip during normal operation of the system either in fine or coarse drive and which therefor may be operatively considered as a positive connection. If, however, any part of the structure is positively prevented from moving, as when, for example, the movable tuning part 6 has reached one limit or the other and is positively stopped at that limit, application of excessive torque to the shaft 50 will cause the ring 60 to ratchet over the cam body 42, as urged by the inclination of the interengaging tooth faces acting against the spring 80. Thus this arrangement constitutes a safety device which, however, plays no part in the normal operation of the drive.

While but a single embodiment of the present invention has been here specifically disclosed, it will be apparent that many variations may be made therein, all within the scope and spirit of the invention.

We claim:

1. A fine-coarse drive comprising a support, an output shaft rotatably mounted thereon, an input shaft rotatably mounted thereon, a member fast on said input shaft and having a forwardly facing serrated surface, cam means freely mounted on said input shaft forwardly of said member and having a rearwardly facing serrated surface operatively engaging said forwardly facing member surface to define therewith a driving connection having a nonslip drive characteristic for normal driving forces, said cam means having a cam surface, a cam follower engaging said cam surface and operatively connected to said output shaft to define a fine drive for the latter, a gear freely mounted on said input shaft forwardly of said cam means, stop means for limiting the forward movement of said gear on said input shaft, spring means operatively interposed between said gear and said cam means and effective to urge the former forwardly into engagement with said stop means and to urge latter rearwardly into said driving engagement with said member, lost motion driving means operatively connected between said cam means and said gear, and coarse drive means operatively connected between said gear and said output shaft.

2. In the drive of claim 1, a wall through which said input shaft extends, said gear being rearward of said wall and said wall comprising said stop means for said gear.

3. In the drive of claim 2, said coarse drive means including a second gear drivingly connected to said output shaft, mounted on said support, and meshing with said first mentioned gear when the latter is in engagement with said stop means.

4. In the drive of claim 3, a sleeve surrounding said input shaft, extending through said wall to a point forwardly thereof, and connected to said gear for rotation therewith.

5. In the drive of claim 2, a sleeve surrounding said input shaft, extending through said wall to a point forwardly thereof, and connected to said gear for rotation therewith.

6. In the drive of claim 1, said coarse drive means including a second gear drivingly connected to said output shaft, mounted on said support, and meshing with said first mentioned gear when the latter is in engagement with said stop means.

7. In the drive of claim 6, a sleeve surrounding said input shaft and connected to said gear for rotation therewith.

8. In the drive of claim 1, a sleeve surrounding said input shaft and connected to said gear for rotation therewith.

References Cited

UNITED STATES PATENTS

| | | | |
|---|---|---|---|
| 3,251,234 | 5/1966 | Valdettaro | 74—10.5 |
| 1,232,779 | 7/1917 | Ewart | 64—29 |
| 1,237,932 | 8/1917 | Marlin | 64—29 |
| 3,292,440 | 12/1966 | Karr et al. | 74—10.5 |

FOREIGN PATENTS

| | | |
|---|---|---|
| 609,651 | 10/1948 | Great Britain. |

MILTON KAUFMAN, *Primary Examiner.*